(12) United States Patent
Christoph

(10) Patent No.: US 6,441,910 B1
(45) Date of Patent: Aug. 27, 2002

(54) SYSTEM FOR MEASURING STRUCTURES OF AN OBJECT

(75) Inventor: Ralf Christoph, Schöffengrund (DE)

(73) Assignee: Werth Messtechnik GmbH, Giessen (DE)

( * ) Notice: Subject to any disclaimer, the term of this patent is extended or adjusted under 35 U.S.C. 154(b) by 0 days.

(21) Appl. No.: 09/700,725

(22) PCT Filed: May 29, 1999

(86) PCT No.: PCT/EP99/03744

§ 371 (c)(1),
(2), (4) Date: Jan. 24, 2001

(87) PCT Pub. No.: WO99/63301

PCT Pub. Date: Dec. 9, 1999

(30) Foreign Application Priority Data

May 29, 1998 (DE) .......................................... 198 24 106
Oct. 16, 1998 (DE) .......................................... 198 47 711

(51) Int. Cl.[7] ................................................ G01B 11/14
(52) U.S. Cl. ................................... 356/614; 250/559.29
(58) Field of Search ................................. 356/601, 608, 356/614, 615, 622; 33/503, 556, 559, 504, 557, 558, 560, 561, DIG. 21; 364/559, 560; 250/559.19, 559.22, 559.29; 483/59

(56) References Cited

U.S. PATENT DOCUMENTS

| 4,631,834 A | * | 12/1986 | Hayashi et al. ............... 33/503 |
| 4,637,119 A | * | 1/1987 | Schneider et al. ............. 33/561 |
| 4,972,597 A | * | 11/1990 | Kadosaki et al. ............. 33/558 |
| 5,189,806 A | * | 3/1993 | McMurtry et al. ............. 33/503 |
| 5,615,489 A | * | 4/1997 | Breyer et al. ................. 33/503 |
| 5,778,548 A | * | 7/1998 | Cerruti ......................... 33/503 |
| 5,825,666 A | * | 10/1998 | Freifeld ...................... 364/560 |

* cited by examiner

Primary Examiner—Hoa Q. Pham
(74) Attorney, Agent, or Firm—Dennison, Schultz & Dougherty

(57) ABSTRACT

A device for measuring structures of an object by means of a stylus (10) assigned to a coordinate measuring device (22) and including a stylus element (12) and a stylus prolongation (14) in the form of an optical waveguide. The coordinate measuring device (22) includes a sensor for the optical determination of the stylus element (12) and/or at least a target marker assigned directly to the stylus element, and an evaluation unit, with which the structure of the object can be- calculated from the position of the optical sensor in relation to the coordinate system of the coordinate measuring device and the position of the stylus element or the target marker, measured directly by means of the optical sensor. The sensor forms a jointly adjustable unit with the stylus, the stylus (10) is connected via an optomechanical interface (28, 34) to an adjustment device (24) in the interchangeable support (16), wherein the adjustment device can be adjusted in relation to or with the interchangeable support, rotationally and linearly, the stylus is connected to the optomechanical interface such that the stylus can be exchanged, and the interchangeable support is connected magnetically and mechanically to a support (20) that is connected to the sensor.

11 Claims, 2 Drawing Sheets

SYSTEM FOR MEASURING STRUCTURES OF AN OBJECT

BACKGROUND OF THE INVENTION

The invention relates to a device for measuring structures of an object by means of a stylus assigned to a coordinate measuring device and comprising a stylus element and a stylus prolongation in the form of an optical waveguide, wherein the coordinate measuring device comprises a sensor for the optical determination of the stylus element, or at least a target marker assigned directly to stylus element, and an evaluation unit, with which the structure of the object can be calculated from the position of the optical sensor in relation to the coordinate system of the coordinate measuring device and the position of the stylus element or the target marker directly by means of the optical sensor.

In measuring structures of an object, the use of coordinate measuring devices that are equipped with electromechanical styluses, with which the position of a structure is determined indirectly, in other words the position of the stylus element (ball) is conveyed via a stylus, is known. The deformations of the stylus caused by this process, combined with frictional forces that are present, can result in a distortion of the measurement results. Further, the heavy transfer of power results in measuring forces typically greater than 10 mN. The geometric design of stylus systems of this type limits them to a ball diameter that is greater than 3.0 mm. Thus, the three-dimensional measurement of smaller structures in the range of a few tenths of a millimeter, and the scanning of easily deformable specimens, become problematic or even impossible. Due to the as-yet unclear effects caused by errors resulting from the deformation of the stylus and/or the stylus element, and due to scanning forces such as stick-slip effects, which also remain unclear, measuring uncertainties, which typically are greater than 1 $\mu$m, occur.

A device of the type described at the beginning can be found in DE 297 10 242 U1. In order to permit several styluses to be inserted one in front of another, an interchangeable device containing several styluses, such as a revolver, is provided for.

A mechanical scanning coordinate measuring device is found, for example, in DE 43 27 250 A1. With this device, the mechanical scanning process can be visually observed on a monitor, as the scanning head is viewed through a video camera. The scanning head, which projects from a magnetic interchangeable support, can be designed as a so-called oscillating crystal probe, which is dampened when it comes in contact with the surface of the work piece. With the video camera it is thus possible to track the position of the scanning ball relative to the work piece, or the boring in the work piece that is to be measured, on the monitor, and to manually observe and control the scanning process upon entry into the boring itself. The actual measurement process is accomplished electromechanically, hence the above-mentioned disadvantages remain.

A method for the optical observation of a stylus head in a coordinate measuring device is also found in DE 35 02 388 A1.

In accordance with DE 43 12 579 A1, in order to allow the precise position of the machine axes of a coordinate measuring device to be determined, at least six sensors are mounted on a center sleeve and/or a measuring head, thus permitting the distance to a reference area to be determined. In this process the object geometries are no longer scanned; instead, a contact-free process is described as a replacement for a classic, incremental position measuring system.

In U.S. Pat. No. 4,972,597 a coordinate measuring device equipped with a stylus is described, in which the stylus prolongation is prestressed in its position via a spring. One section of the stylus prolongation, which extends through a housing, is equipped with two elements, spaced a certain distance from one another, both of which emit light; this allows the position of the stylus prolongation to be determined using a sensor element, thereby allowing the position of a stylus element which is positioned at the far end of the stylus prolongation to be indirectly determined.

In this case as well, optical sensor technology replaces the classic position measuring systems of electromechanical scanning systems. Again, the actual scanning process is implemented via transfer of force from the stylus element to the stylus via the spring elements to the sensor. The above-described problems with deflection and scanning force remain. This is an indirect process.

To permit the measurement of large bodies such as aircraft components, the use of styluses that are equipped with light sources or reflective target marks is known; in such processes, the position of the stylus is established optically (DE 36 29 689 A1, DE 26 05 772 A1, DE 40 02 043 C2). The styluses themselves are moved manually or robotically along the surface of the body to be measured.

In such processes, the position of the stylus element is determined steroscopically via triangulation or a similar process. The resolution of the entire measuring system is thus limited directly by the sensor resolution. The use of such systems can thus be considered only in cases in which requirements in terms of the ratio between the area to be measured and the necessary precision are relatively low. For practical purposes, the use of such systems is limited to the measurement of large components.

In a further known process, the position of the stylus element is sighted using a microscope. In this case a direct-light method is used, so that only structures such as through borings or similar structures can be measured relative to diameter measurement. Due to the process of visual evaluation under the microscope, and the separation of the stylus and the viewing optics, the measurement of more complex structures (distances of complex geometries, angles, etc.), and automatic measurement are not possible. In addition, susceptibility to interference in this process is very high, hence systems of this type are not an option.

SUMMARY OF THE INVENTION

The object of the present invention is to improve upon a device of the type described above such that any kind of structures can be determined with a high degree of measuring accuracy, while allowing for the easy adjustment and rapid exchange of the stylus.

The object is largely attained in accordance with the invention, in that the sensor forms a jointly adjustable unit with the stylus; in that the stylus is connected to an adjustment unit of an interchangeable support via an optomechanical interface, wherein the adjustment unit can be adjusted in relation to or with the interchangeable support, rotationally and linearly; in that the stylus is connected to the optomechanical interface such that it can be exchanged; and in that the interchangeable support is magnetically and/or mechanically connected to a support that is connected to the sensor.

In accordance with the teaching of the invention, the position of the stylus element, which is conditioned by its contact with the object, is determined optically, in order to permit the measurement of the curve of a structure directly from the position of the stylus element itself or that of a target marker. In this, the displacement of the stylus element can be established by shifting the image on a sensor field of an electronic image processing system having an electronic camera. It is possible to determine the displacement of the stylus element evaluating a contrast function of the image using an electronic image processing system. A further possibility for determining the displacement uses a change in size of the image of a target marker, which results in a geometric optical connection between the object distance and its magnification. With another possible method, the displacement of the stylus element can be established using the apparent change in size of a target marker resulting from the loss in contrast caused by defocusing. In this, the displacement is determined perpendicular to the optical axis of the electronic camera.

In order to allow the stylus element or the target marker assigned to this stylus element to be easily positioned, and to enable an exchange of styluses without an undesirable waste of time, the invention provides for the stylus to be connected to an adjustment device in the interchangeable support via an optomechanical interface, wherein the adjustment device itself can be rotated around at least three linear and two rotational axes. This permits a rapid adjustment of the stylus, so that only short periods of time are required for calibration. Through the optomechanical interface or that of the interchangeable support, the stylus can be rapidly exchanged.

In accordance with a further development on the invention, the optomechanical interface can comprise a sleeve that holds a cylinder, wherein the stylus or its stylus prolongation is taken up on the cylinder. In this, the stylus or the stylus prolongation extends at least in alignment with the end surface of the cylinder that faces the optical axis, and may extend through it.

A light source, such as an LED, is positioned at the end surface of the cylinder, and is supplied with electrical power via electrical enclosures that run through the interchangeable support.

Further details, advantages, and characteristics of the invention are given not only in the claims, and in the characteristics found in these claims—taken individually and/or in combination—, but also in the following description of the preferred exemplary embodiment depicted in the diagrams.

BRIEF DESCRIPTION OF THE DRAWINGS

The diagrams show.

DETAILED DESCRIPTION OF THE INVENTION

Figure 1:
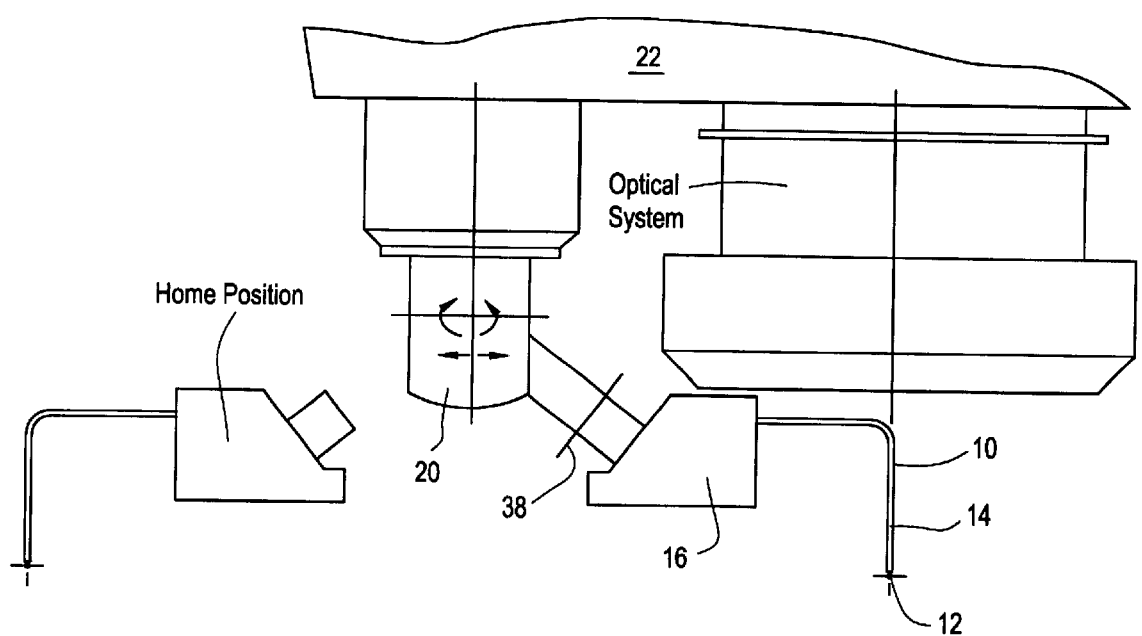
FIG. 1 a sketch showing the principle design of a device for measuring structures of an object and FIG. 2 the device shown in FIG. 1, in a partial cross-section.
Figure 2:
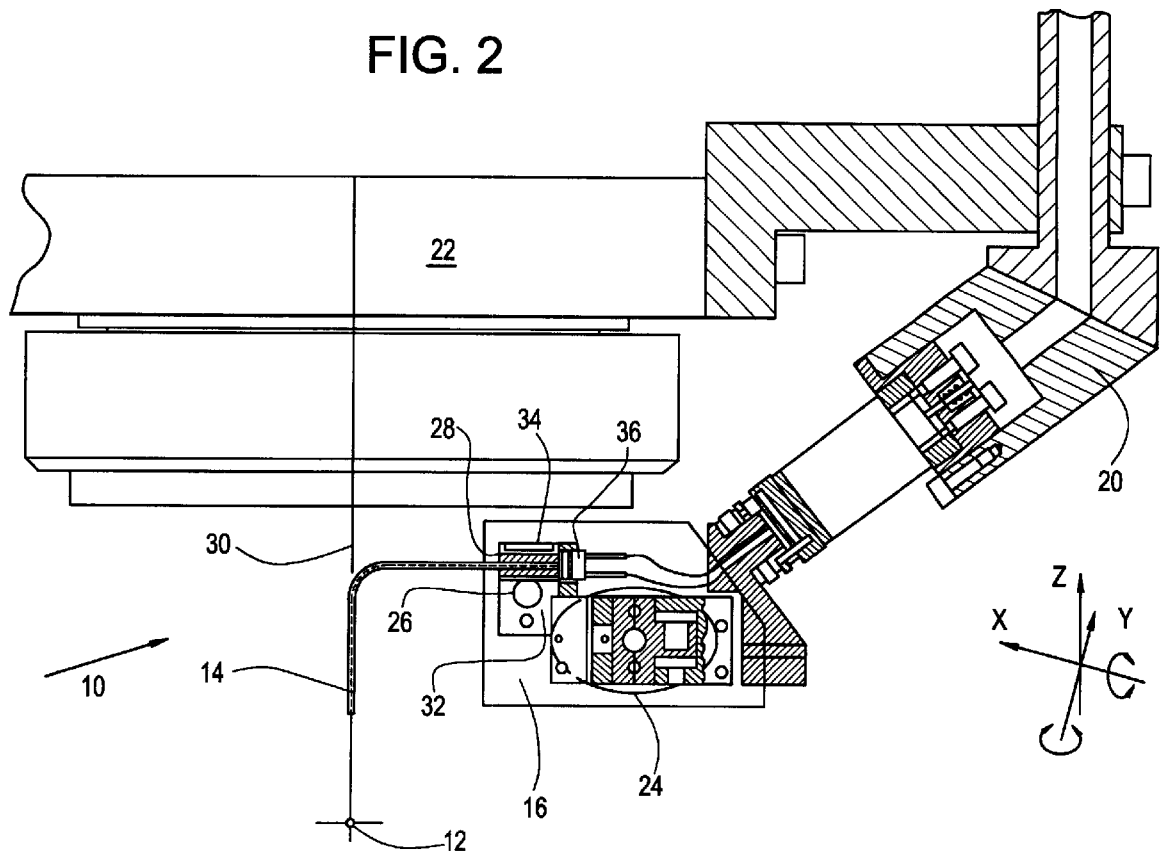

The figures illustrate the principle design of an embodiment of a device for measuring structures of an object using a stylus 10 that is assigned to a coordinate measuring device.

The stylus 10 comprises a stylus element 12 or a target marker assigned to the stylus, which extends from a stylus prolongation 14, which holds the end of the stylus element 12, and which can be designed in the form of an optical waveguide. Hence the stylus 10 may be a fiber optic stylus. Regardless, the stylus prolongation either has a flexible section or is designed to be entirely flexible.

The stylus 10 extends from an interchangeable support 16, which is attached magnetically to a support 20; this support can be adjusted as a unit together with the coordinate measuring device 22 and with the optical sensor in the measuring device.

The interchangeable support 16 itself comprises an adjustment device 24 from which the stylus 10 extends through an optomechanical interface 26. The optomechanical interface 26 comprises a cylinder 28, through which the stylus prolongation 14 extends, up to the end surface of the cylinder 32 that faces the optical axis 30. The cylinder 28 is firmly attached within a sleeve 34. A light source in the form of an LED 36 is positioned opposite the end surface of the cylinder 32, in order to throw light upon the stylus prolongation 14, which is an optical waveguide; the light extends to the stylus element 12, which permits the stylus element 12 to be viewed through the optics of the coordinate measuring device 22 or through a corresponding sensor.

The interchangeable interface 38 between the interchangeable support 16 and the support 20 has the necessary electrical power lines running through it, in order, for example, to supply the light source 36 with electrical power.

What is claimed is:

1. Device for measuring structures of an object by means of a stylus (10) assigned to a coordinate measuring device (22) and comprising a stylus element (12) and a stylus prolongation (14) in the form of an optical waveguide, wherein the coordinate measuring device (22) comprises a sensor for the optical determination of the stylus element (12) and/or at least a target marker assigned directly to the stylus element, and an evaluation unit, with which the structure of the object can be calculated from the position of the optical sensor in relation to the coordinate system of the coordinate measuring device and the position of the stylus element or the target marker, measured directly by means of the optical sensor, characterized in that the sensor forms a jointly adjustable unit with the stylus; in that the stylus (10) is connected via an optocmechanical interface (28, 34) to an adjustment device (24) in the interchangeable support (16), wherein the adjustment device can be adjusted in relation to or with the interchangeable support, rotationally and linearly; in that the stylus is connected to the optomechanical interface such that the stylus can be exchanged; and in that the interchangeable support is connected magnetically and mechanically to a support (20) that is connected to the sensor.

2. Device in accordance with claim 1, characterized in that the adjustment device (24) can be adjusted around three linear and at least two rotational axes (x,y,z).

3. Device in accordance with claim 1 characterized in that the optomechanical interface comprises a cylinder (28) held inside a sleeve (34), wherein the stylus prolongation (14) is taken up by the cylinder such that it can be exchanged.

4. Device in accordance with claim 3, characterized in that the stylus prolongation (14) extends to or through, and is in alignment with, the rear end face (32) of the cylinder (28).

5. Device in accordance with claim 4, characterized in that a light source (36) comprising an LED is positioned opposite the end surface (32) of the cylinder (28).

6. Device in accordance with claim 4, characterized in that the cylinder (28) can be locked into the sleeve (34).

7. Device in accordance with claim 3, characterized in that a light source (36) comprising an LED is positioned opposite the end surface (32) of the cylinder (28).

8. Device in accordance with claim 7, characterized in that the cylinder (28) can be locked into the sleeve (34).

9. Device in accordance with claim 3, characterized in that the cylinder (28) can be locked into the sleeve (34).

10. Device in accordance with claim 2 characterized in that the optomechanical interface comprises a cylinder (28) held inside a sleeve (34), wherein the stylus prolongation (14) is taken up by the cylinder such that it can be exchanged.

11. Device in accordance with claim 1, characterized in that the interchangeable support (16) is attached to the support (20) in a mechanically interlocking and/or mechanically actuated connection.

* * * * *